(12) United States Patent
White et al.

(10) Patent No.: US 6,875,832 B2
(45) Date of Patent: Apr. 5, 2005

(54) SYNTHESIS OF VINYL POLYMERS BY CONTROLLED RADICAL POLYMERIZATION

(75) Inventors: Daniela White, Pittsburgh, PA (US); James B. O'Dwyer, Valencia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 56 days.

(21) Appl. No.: 10/116,239

(22) Filed: Apr. 4, 2002

(65) Prior Publication Data

US 2003/0018151 A1 Jan. 23, 2003

Related U.S. Application Data

(60) Provisional application No. 60/286,142, filed on Apr. 24, 2001.

(51) Int. Cl.[7] ............................................. C08F 4/04
(52) U.S. Cl. .................. 526/219.6; 526/83; 526/220; 526/317.1; 526/319
(58) Field of Search ............................ 526/219.6, 319, 526/317.1, 83, 220; 525/66, 158, 169, 170, 179, 119, 924, 94, 208, 92 K, 124, 123

(56) References Cited

U.S. PATENT DOCUMENTS

| | | | |
|---|---|---|---|
| 3,947,338 A | 3/1976 | Jerabek et al. | 204/499 |
| 3,984,299 A | 10/1976 | Jerabek | 523/415 |
| 4,147,679 A | 4/1979 | Scriven et al. | 523/404 |
| 4,403,003 A | 9/1983 | Backhouse | 427/407.1 |
| 4,732,790 A | 3/1988 | Blackburn et al. | 427/407.1 |
| 4,798,746 A | 1/1989 | Claar et al. | 427/407.1 |
| 4,889,890 A | 12/1989 | Kerr et al. | 525/113 |
| 4,937,288 A | 6/1990 | Pettit, Jr. et al. | 525/176 |
| 4,997,900 A | 3/1991 | Brinkman | 528/45 |
| 5,071,904 A | 12/1991 | Martin et al. | 524/458 |
| 5,098,955 A | 3/1992 | Pettit, Jr. | 525/194 |
| 5,202,382 A | 4/1993 | Pettit, Jr. | 525/108 |
| 5,214,101 A | 5/1993 | Pettit, Jr. et al. | 525/176 |
| 5,407,707 A | 4/1995 | Simeone et al. | 427/410 |
| 5,439,896 A | 8/1995 | Ito et al. | 525/107 |
| 5,489,654 A | 2/1996 | Clouet | 525/398 |
| 5,508,337 A | 4/1996 | Wamprecht et al. | 524/507 |
| 5,510,444 A | 4/1996 | Halpaap et al. | 528/45 |
| 5,554,692 A | 9/1996 | Ross | 525/124 |
| 5,658,986 A | 8/1997 | Clouet | 525/88 |
| 5,663,240 A | 9/1997 | Simeone et al. | 525/327.3 |
| 5,710,214 A | 1/1998 | Chou et al. | 525/124 |
| 5,763,548 A | 6/1998 | Matyjaszewski et al. | 526/135 |
| 5,777,061 A | 7/1998 | Yonek et al. | 528/45 |
| 5,789,487 A | 8/1998 | Matyjaszewski et al. | 525/301 |
| 5,807,937 A | 9/1998 | Matyjaszewski et al. | 526/135 |
| 5,866,047 A | 2/1999 | Nagino et al. | 264/1.27 |
| 6,169,147 B1 | 1/2001 | Kroeze et al. | 525/285 |
| 6,265,489 B1 * | 7/2001 | Barkac et al. | 525/119 |
| 6,294,014 B1 * | 9/2001 | Woodworth et al. | 106/499 |
| 6,319,987 B1 * | 11/2001 | White et al. | 525/92 K |
| 6,462,125 B1 * | 10/2002 | White et al. | 524/560 |

FOREIGN PATENT DOCUMENTS

| | | | |
|---|---|---|---|
| FR | 2 653 433 | 4/1991 | ......... C07D/303/12 |
| JP | 61 233023 | 10/1986 | ............... C08J/7/00 |
| JP | 04 213307 | 8/1992 | ............ C08F/12/08 |

OTHER PUBLICATIONS

Suwier et al., "Flexibilized Styrene–N–Substituted Maleimide Copolymers. II. Multiblock Copolymers Prepared from PTHF–Based Iniferters," *J. Polym. Sci.: Part A: Polym. Chem.*, vol. 38, pp. 3558–3568, 2000.

Chen et al., "A novel thermal iniferter for radical polymerization," *Eur. Polym. J.*, vol. 36, pp.1547–1554, 2000.

Qin et al., "A Reverse ATRP Process with a Hexasubstituted Ethane Thermal Iniferter Diethyl 2,3–Dicyano–2,3–di(p–tolyl)succinate as the Initiator," *Macromolecules*, vol. 33, pp. 6987–6992, 2000.

Qin et al., "Polymerization of Vinyl Monomers Using a Novel Trifunctional Iniferter," *J. Polym. Sci.: Part A: Polym. Chem.*, vol. 38, pp. 2115–2102, 2000.

Qin et al., "*Living*/controlled radical polymerization of methyl methacrylate by reverse ATRP with DCDPS/FeCl₃/PPh₃ initiating system," *Polymer*, vol. 41, pp. 7347–7353, 2000.

Qin et al., "'Living' Radical Polymerization of Methyl Methacrylate with Diethyl 2,3–Dicyano–2,3–Diphenylsuccinate as a Thermal Iniferter," *J. Polym. Sci.: Part A: Polym. Chem.*, vol. 37, pp. 4610–4615, 1999.

Lokaj et al., "Synthesis and Characterization of Styrene–N–Butyl Maleimide Copolymers Using Iniferters Containing Thiyl End Groups," *J. Appl. Polym. Sci.*, vol. 67, pp. 755–762, 1998.

Tharanikkarasu et al., "Tetraphenylethane Iniferters: Polyurethane–Polystyrene Multiblock Copolymers Through 'Living' Radical Polymerization," *J. Appl. Polym. Sci.*, vol. 66, pp. 1551–1560, 1997.

(Continued)

Primary Examiner—Tatyana Zalukaeva
(74) Attorney, Agent, or Firm—William J. Uhl

(57) ABSTRACT

A controlled free radical polymerization process, which includes the steps of: adding a monofunctional iniferter compound to an oxygen-free solvent; heating the solution to a temperature sufficient to allow the iniferter compound to form two carbon centered radical residues; adding a first monomer composition comprising one or more monomers to the solution containing the radical containing residues; polymerizing the first monomer composition to form a quasi-living polymer; and optionally polymerizing a second monomer composition comprising one or more monomers, which are different than the first monomer composition. The resulting non-random copolymer having the general formula:

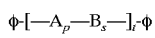

where A and B are different compositions of ethylenically unsaturated monomers; p is an integer from 1 to 1,000; s is an integer from 0 to 1,000; t is an integer from 1 to 100; and φ is a residue from the iniferter.

8 Claims, No Drawings

OTHER PUBLICATIONS

Tharanikkarasu et al., "Tetraphenylethane Iniferters–9. Diphenylmethane Diisocyanate–Based Polyurethane–Polystyrene Block Copolymers Through 'Living' Radical Mechanism," *Eur. Polym. J.*, vol. 33, Nos. 10–12, pp. 1779–1786, 1997.

Tharanikkarasu et al., "Tetraphenylethane Iniferters. 3. 'Living' Radical Polymerization of Methyl Methacrylate using Toluene–Diisocyanate–Based Polyurethane Iniferter," *J.M.S.–Pure Appl. Chem.*, vol. A33, No. 4, pp. 417–437, 1996.

Kroeze et al., "Synthesis if Segmented (PB(PS–*block*–PB)$_n$) and (PB(SAN–*block*–PB)$_n$) Block Copolymers via Polymeric Thermal Iniferters," *Macromolecules*, vol. 28, pp. 6650–6656, 1995.

Nair et al., "A–B–A Triblock and (A–B)$_n$ Segmented Block Copolymers of Styrene and Ethylene Oxide via Thermal Iniferters," *J. Macromol. Sci.–Chem.*, vol. A27, No. 6, pp. 791–806, 1990.

Nair et al., "Block Copolymers via Thermal Polymeric Iniferters. Synthesis of Silicone–Vinyl Block Copolymers," *Macromolecules*, vol. 23, pp. 1361–1369, 1990.

Nair et al., "Functionalization of vinyl polymers through polymeric iniferters: synthesis of poly(methyl methacrylate–*b*–phosphonamide) and poly(styrene–*b*–phosphonamide)," *Polymer*, vol. 29, pp. 1909–1917, 1988.

Otsu et al., "Radical polymerization of methyl methacrylate with some 1,2–disubstituted tetraphrenylethanes as thermal iniferters," *Polymer Bulletin*, vol. 17, pp. 323–330, 1987.

Tazaki et al., "Radical polymerization of methyl methacrylate with methyl 2,2–dimethyl–3,3–diphenyl–3–cyanopropionate as a thermal iniferter," *Polymer Bulletin*, vol. 17, pp. 127–134, 1987.

Otsu et al., "Living radical polymerization in homogenous system with phenylazotriphenylmethane as a thermal iniferter," *Polymer Bulletin*, vol. 16, pp. 277–284, 1986.

\* cited by examiner

SYNTHESIS OF VINYL POLYMERS BY CONTROLLED RADICAL POLYMERIZATION

CROSS-REFERENCE TO RELATED APPLICATION

This application claims priority under 35 U.S.C. § 119 to Provisional Application Ser. No. 60/286,142, filed Apr. 24, 2001.

FIELD OF THE INVENTION

The present invention is directed to a method of controlled radical polymerization of vinyl monomers. Specifically, the invention is directed to a method of controlled polymerization of vinyl monomers using an iniferter initiator, which is capable of forming a carbon centered radical.

BACKGROUND OF THE INVENTION

A wide variety of radically polymerizable monomers, such as methacrylic and acrylic monomers, is commercially available and can confer a wide range of properties to a polymer or copolymer (hereinafter, collectively referred to as (co)polymer). The use of conventional free radical (co)polymerization methods to synthesize (co)polymers provides little control over molecular weight, molecular weight distribution and, in particular, (co)polymer chain structure.

In order to overcome this problem, polymerization methods based ionic methods (anionic and cationic polymerization) were developed that would enable the artisan a degree of control over the placement of monomers along a growing polymer chain. These methods are limited, however, to a relatively narrow class of monomer and polymer types.

A further development provides a method of free radical polymerization, in which a "living" polymer containing a radically transferable atom or group is employed to enable a degree of control over (co)polymer composition and architecture. These methods, referred to collectively as atom or group radical transfer polymerization (ATRP), are described in, for example, U.S. Pat. Nos. 5,807,937, 5,789,487 and 5,763,548 to Matyjaszewski et al. The ATRP method is described as providing highly uniform products having controlled structure (i.e., controllable topology, composition, etc.).

However, ATRP type processes require the use of halogenated hydrocarbon initiators and transition metal catalysts, which cause safety and material compatibility concerns when implemented at production scale. Further, although more versatile than ionic polymerization methods, a number of functional monomers, for example carboxylic acid functional monomers, cannot be polymerized directly using ATRP methodologies.

A further technique that has been explored to provide control over a radical polymerization process is those processes utilizing iniferter initiators. Iniferter initiators contain a chemical bond that will break under appropriate thermal or photolytic conditions, forming two carbon centered radicals. The radicals are capable of polymerizing monomers and the polymerization step competes with radical recombination. Functional groups that have found use in iniferter initiators include thiuram disulfides, dithiocarbamate disulfides and ethylene derivatives that contain at least four stabilizing groups.

Thiouram iniferter initiators are disclosed in, for example, U.S. Pat. No. 6,169,147 to Kroeze et al.; Lokaj et al., *Journal of Applied Polymer Science*, 67, 755–762 (1998); Kroeze et al., *Macromolecules*, 28, 6650–6656 (1995); Nair et al., *J. Macromol. Sci.—Chem.*, A27(6), 791–806 (1990); and Nair et al., *Polymer*, 29, 1909–1917 (1988). Thiuram disulfide iniferter initiated polymerizations are able to produce block copolymers, but typically with limited control and wide molecular weight distributions.

Dithiocarbamate disulfide iniferter initiators are disclosed in, for example, U.S. Pat. No. 5,866,047 to Nagino et al., U.S. Pat. No. 5,658,986 to Clouet and U.S. Pat. No. 5,489,654 to Clouet; Suwier at al., *Journal of Polymer Science: Part A: Polymer Chemistry*, 38, 3558–3568 (2000); and Nair et al., *Macromolecules*, 23, 1361–1369 (1990). Dithiocarbamate disulfide iniferter initiated polymerizations are able to produce block copolymers, but typically with limited control and wide molecular weight distributions.

Various multisubstituted ethylene derivatives have been disclosed as iniferter initiators. For example, U.S. Pat. No. 5,866,047 to Nagino et al., Chen et al., *European Polymer Journal*, 36, 1547–1554 (2000), Tharanikkarusa et al., *Journal of Applied Polymer Science*, 66, 1551–1560 (1997); and Tharanikkarusa et al., *J.M.S.—Pure Appl. Chem.*, A33(4), 417–437 (1996) disclose derivatives of 1,1,2,2-tetraphenyl-1,2-ethanediol as iniferter initiators. The use of phenylazotriphenyl methane as an iniferter initiator is disclosed by Otsu et al., *Polymer Bulletin*, 16, 277–284 (1996). Various 1,2-dicyano-1,2-diphenylethane derivatives are described as iniferter initiators by Qin et al., *Macromolecules*, 33, 6987–6992 (2000); Qin et al., *Journal of Polymer Science: Part A: Polymer Chemistry*, 38, 2115–2120 (2000); Qin et al., *Polymer*, 41, 7347–7353 (2000); Qin et al., *Journal of Polymer Science: Part A: Polymer Chemistry*, 37, 4610–4615 (1999); Tharanikkarusa et al., *European Polymer Journal*, 33, 1779–1789 (1997); Tazaki et al., *Polymer Bulletin*, 17, 127–134 (1987); and Otsu et al., *Polymer Bulletin*, 17, 323–330 (1987). The multisubstituted ethylene derivative iniferter initiated polymerizations are all able to produce block copolymers, but typically also demonstrate limited control of the polymerization process and the resulting polymers had wide molecular weight distributions.

All of the cited iniferter technology utilized either disulfide groups or ethylene derivatives with multiple radical stabilizing groups, such as phenyl and cyano, to effect a somewhat controlled polymerization process. In the case of disulfide iniferters, the sulfide and dithiocarbamate groups are prone to side reactions and early termination reactions. The multi-phenyl substituted ethylene iniferters are similarly prone to side reactions and early termination reactions. These problems lead to poor control of the polymerization process and a wide, bimodal or multimodal molecular weight distribution.

There remains a need for a method of controlled polymerization, which is capable of polymerizing a wide variety of functional monomers. The controlled polymerization method should also provide for copolymer composition and architecture control as well as providing for control over polymer molecular weight and molecular weight distribution.

SUMMARY OF THE INVENTION

In accordance with the present invention, there is provided a controlled free radical polymerization process, which includes the steps of:

adding a compound, with one or more stabilizing groups for a carbon centered radical, which is able to initiate free radical polymerization, to a solvent, forming a solution, which is substantially free of oxygen;

heating the solution to a temperature sufficient to allow the compound to form two residues with each residue containing a carbon centered radical;

adding a first monomer composition comprising one or more ethylenically unsaturated monomers to the solution containing the carbon centered radical residues;

polymerizing the first monomer composition to form a quasi-living polymer;

optionally adding a second, third, fourth, etc. monomer composition comprising one or more ethylenically unsaturated monomers, which is different than the first monomer composition, to the quasi-living polymer solution; and polymerizing the second monomer composition.

The present invention is further directed to a non-random copolymer of general formula I:

$$\phi\text{-}[\text{---}A_p\text{---}B_s\text{---}]_t\text{-}\phi \qquad (I)$$

where A and B are different compositions of ethylenically unsaturated monomers; p is an integer from 1 to 1,000; s is an integer from 0 to 1,000; t is an integer from 1 to 100; and $\phi$ is a residue from a carbon centered radical capable of initiating free radical polymerization.

DETAILED DESCRIPTION OF THE PREFERRED EMBODIMENT

Other than in the operating examples, or where otherwise indicated, all numbers or expressions referring to quantities of ingredients, reaction conditions, etc., used in the specification and claims are to be understood as modified in all instances by the term "about".

The terms (meth)acrylic and (meth)acrylate are meant to include both acrylic and methacrylic acid derivatives, such as the corresponding alkyl esters often referred to as acrylates and (meth)acrylates, which the term (meth)acrylate is meant to encompass.

Unless otherwise noted, the term (co)polymer is meant to include homopolymers, or polymers containing one monomer and copolymers, or polymers containing more than one monomer in all forms, i.e., random, alternating, block, gradient, etc.

The controlled free radical polymerization process of the present invention can generally be described as including the steps of:

adding a compound capable of forming a carbon centered radical, which is able to initiate free radical polymerization (an iniferter), of general structure II:

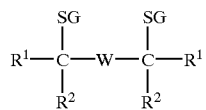

(II)

wherein $R^1$ is selected from the group consisting of $C_1$ to $C_{20}$ alkyl, cyclic, heterocyclic or alkynol; $R^2$ is selected from the group consisting of H and $C_1$–$C_4$ alkyl; SG is a radical stabilizing group; and W may be a C—C bond or a group that decomposes to form two residues containing a carbon centered radical, such as, for example, an —O—O— group or a —N=N— group; to a solvent, forming a solution, which is substantially free of oxygen;

heating the solution to a temperature sufficient to allow the compound to form two carbon centered radical residues;

adding a first monomer composition comprising one or more ethylenically unsaturated monomers to the solution containing the carbon centered radical residues;

polymerizing the first monomer composition to form a quasi-living polymer;

optionally, adding a second monomer composition comprising one or more ethylenically unsaturated monomers, which is different than the first monomer composition, to the quasi-living polymer solution; and polymerizing the second monomer composition.

By quasi-living polymer, what is meant is a polymer that will not spontaneously incorporate a monomer added to a solution containing the quasi-living polymer, but will incorporate the monomer under specific conditions, such as, for example, sufficient temperature or exposure to a specific wavelength or quantum of light.

The radical stabilizing group, SG, of the iniferter of the present invention can be any functional group that is capable of stabilizing a free radical at the adjacent carbon atom. The most effective radical stabilizing groups are able to delocalize the radical through various resonance structures. Examples of radical stabilizing groups that can be used as part of the present invention include, but are not limited to nitrile, ester, amide, carboxyl, allyl, nitro, aryl and halide.

Preferred compounds that are capable of acting as iniferters in the present invention include azobisalkylonitriles, bisalkylonitriles, bisphenylalkanes, bishalolalkanes, biscarboxyalkanes and bisnitroalkanes. Particularly preferred compounds are those of general formulas III–VIII:

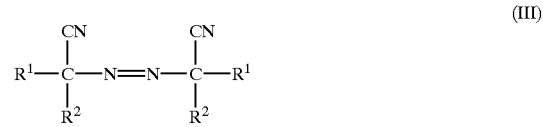

(III)

(IV)

(V)

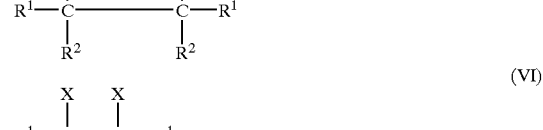

(VI)

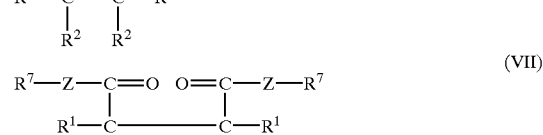

(VII)

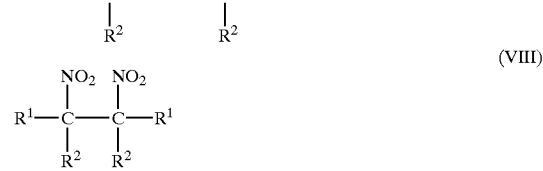

(VIII)

where $R^1$ and $R^2$ are independently selected from H, $C_1$–$C_{20}$ alkyl, cyclic, heterocyclic and alkynol, $R^7$ is selected from H, $C_1$–$C_{20}$ alkyl, cyclic, heterocyclic, alkynol, and aryl; Z is O or NH; and X is a halogen.

In general, the iniferter compound capable of forming a carbon centered radical breaks down, when exposed to a sufficient temperature or light, to form two carbon centered radical residues as described in Scheme I:

Scheme I

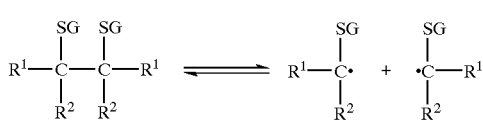

Surprisingly, this is accomplished with an iniferter residue containing only one stabilizing group for the free radical. Each carbon centered radical residue is capable of then initiating polymerization as shown in Scheme II:

Scheme II

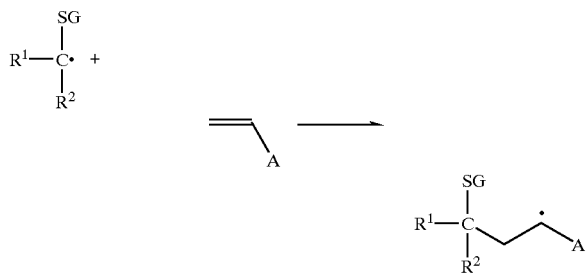

The polymer may grow through conventional free radical addition polymerization, or recombine with a carbon centered radical residue as shown in Scheme III:

Scheme III

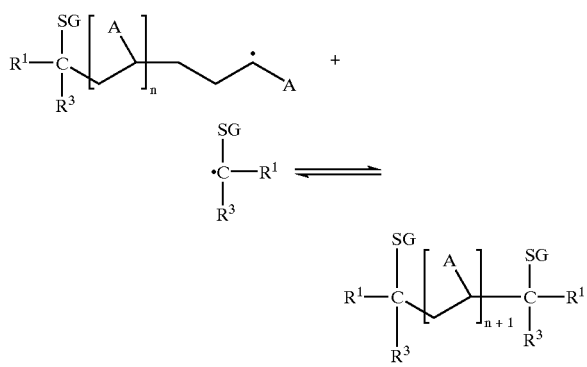

The terminal carbon centered radical residue is able, when exposed to a sufficient temperature or light, to break down and reform a carbon centered free radical residue, a quasi-living free radical polymer, as shown in Scheme IV:

Scheme IV

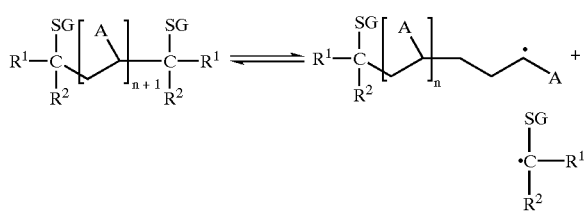

When a second monomer is added to the "quasi-living" polymer, a block copolymer is achieved as depicted in Scheme V.

Scheme V

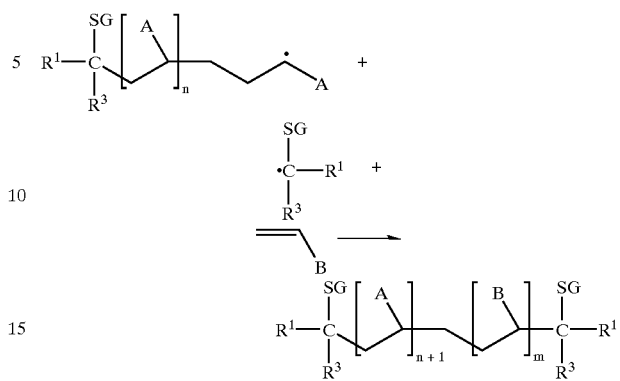

With regard to Schemes I–V, A and B represent functional groups of different polymerizable ethylenically unsaturated monomers and n and m are integers representing the block lengths of each monomer composition represented by A and B, respectfully. $R^1$, $R^2$ and SG are as described above.

In the present invention, it has been found that certain compounds capable of forming carbon centered radicals are capable of acting as iniferter initiators providing a quasi-living polymer, which can be used to control the polymerization process. As opposed to prior art iniferters, the iniferters of the present invention contain only one stabilizing group in the free radical containing residue. This effect is obtained by regulating the temperature and monomer addition of the polymerization process. The method of the present invention does not require the presence of transition metals or potential corrosive halides.

The iniferter compound of the present invention can be a bis tertiary alkyl compound, which is added directly to a solvent. An azobis tertiary alkyl compound can also be used and is added to a solvent, heated to decompose to form free radical containing residues that then recombine and are capable of acting as iniferters, breaking down to reform free radical containing residues.

Examples of suitable azobis tertiary alkyl compounds include, but are not limited to, 4-4'-azobis(4-cyanovaleric acid), 1-1'-azobiscyclohexanecarbonitrile, 2-2'-azobisisobutyronitrile, 2-2'-azobis(2-methylpropionamidine)dihydrochloride, 2-2'-azobis(2-methylbutyronitrile), 2-2'-azobis(propionitrile), 2-2'-azobis(2,4-dimethylvaleronitrile), 2-2'-azobis(valeronitrile), 2,2'-azobis[2-methyl-N-(2-hydroxyethyl)propionamide], 4,4'-azobis(4-cyanopentanoic acid), 2,2'-azobis(N,N'-dimethyleneisobutyramidine), 2,2'-azobis(2-amidinopropane)dihydrochloride, 2,2'-azobis(N,N'-dimethyleneisobutyramidine)dihydrochloride, and 2-(carbamoylazo)-isobutyronitrile.

Preferred azobis tertiary alkyl compounds include 2,2'-azobis(2-methyl-butyronitrile), dimethyl 2,2'-azobisisobutyrate and 4,4'-azobis(4-cyanopentanoic acid).

Examples of suitable bis tertiary alkyl compounds include, but are not limited to, 4,5 dicyano-4,5 dimethyl suberic acid, 1,1'-dicyanodicyclohexyl, 2,3-dicyano-2,3-dimethylbutane, 2,2,3,3-tetramethyl-1,4-diamidinylbutane dihydrochloride, 2,2,3,3-tetramethyl-N,N'-dihydroxyethyl succinamide, and 2,2,3,3-tetramethyl-N,N'-tetramethylene succinamide.

In the method of the present invention, the iniferter is decomposed at a temperature that will accomplish the decomposition but minimize the occurrence of unwanted or unanticipated side and competing reactions. The method can be performed at any temperature that accomplishes this aim. The controlled polymerization process of the present invention may be performed at from 20° C. to 250° C., preferably from 50° C. to 200° C., and more preferably from 60° C. to 150° C.

In the present invention any ethylenically unsaturated monomer can be used. The ethylenically unsaturated monomers can be described by general formula IX:

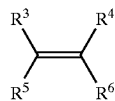

(IX)

wherein $R^3$, $R^4$ and $R^6$ are independently selected from the group consisting of H, halogen, CN, $CF_3$, straight or branched alkyl of 1 to 20 carbon atoms (preferably from 1 to 6 carbon atoms, more preferably from 1 to 4 carbon atoms), aryl, unsaturated straight or branched alkenyl or alkynyl of 2 to 10 carbon atoms (preferably from 2 to 6 carbon atoms, more preferably from 2 to 4 carbon atoms), unsaturated straight or branched alkenyl of 2 to 6 carbon atoms (preferably vinyl) substituted (preferably at the α-position) with a halogen (preferably chlorine), $C_3$–$C_8$ cycloalkyl, heterocyclyl, phenyl, which may optionally have from 1–5 substituents on the phenyl ring, C(=Y)$R^9$, C(=Y)NR$^{10}$R$^{11}$, YCR$^{10}$R$^{11}$R$^{12}$ and YC(=Y)R$^{12}$, where Y may be NR$^{12}$ or O (preferably O), $R^9$ is alkyl of from 1 to 20 carbon atoms, alkoxy of from 1 to 20 carbon atoms, aryloxy or heterocyclyloxy, $R^{10}$ and $R^{11}$ are independently H or alkyl of from 1 to 20 carbon atoms, or $R^{10}$ and $R^{11}$ may be joined together to form an alkylene group of from 2 to 5 carbon atoms, thus forming a 3- to 6-membered ring, and $R^{12}$ is H, straight or branched $C_1$–$C_{20}$ alkyl and aryl; $R^5$ is selected from the group consisting of H, halogen, $C_1$–$C_6$ alkyl, CN, COOR$^8$, wherein $R^8$ is selected from the group consisting of H, an alkali metal, a $C_1$–$C_6$ alkyl group and aryl.

Specific examples of vinyl monomers that may be polymerized by the method of the present invention include vinyl monomers, allylic monomers, olefins, (meth)acrylic acid, (meth)acrylates, (meth)acrylamide, N- and N,N-disubstituted (meth)acrylamides, vinyl aromatic monomers, vinyl halides, vinyl esters of carboxylic acids and mixtures thereof. More specific examples of suitable monomers include, without limitation, $C_1$–$C_{20}$ alkyl (meth)acrylates (including linear or branched alkyls and cycloalkyls) which include, but are not limited to, methyl (meth)acrylate, ethyl (meth)acrylate, propyl (meth)acrylate, isopropyl (meth)acrylate, n-butyl (meth)acrylate, iso-butyl (meth)acrylate, tert-butyl (meth)acrylate, 2-ethylhexyl (meth)acrylate, lauryl (meth)acrylate, isobornyl (meth)acrylate, cyclohexyl (meth)acrylate, 3,3,5-trimethylcyclohexyl (meth)acrylate and isocane (meth)acrylate; oxirane functional (meth)acrylates which include, but are not limited to, glycidyl (meth)acrylate, 3,4-epoxycyclohexylmethyl(meth)acrylate, and 2-(3,4-epoxycyclohexyl) ethyl(meth)acrylate; hydroxy alkyl (meth)acrylates having from 2 to 4 carbon atoms in the alkyl group which include, but are not limited to, hydroxyethyl (meth)acrylate, hydroxypropyl (meth)acrylate and hydroxybutyl (meth)acrylate. The residues may each independently be residues of monomers having more than one (meth)acryloyl group, such as (meth)acrylic anhydride, diethyleneglycol bis(meth)acrylate, 4,4'-isopropylidenediphenol bis(meth)acrylate (bisphenol A di(meth)acrylate), alkoxylated 4,4'-isopropylidenediphenol bis(meth)acrylate, trimethylolpropane tris(meth)acrylate and alkoxylated trimethylolpropane tris(meth)acrylate.

In the context of the present application, the terms "alkyl", "alkenyl" and "alkynyl" refer to straight-chain or branched groups. Furthermore, in the present application, "aryl" refers to phenyl, naphthyl, phenanthryl, phenalenyl, anthracenyl, triphenylenyl, fluoranthenyl, pyrenyl, pentacenyl, chrysenyl, naphthacenyl, hexaphenyl, picenyl and perylenyl (preferably phenyl and naphthyl), in which each hydrogen atom may be replaced with alkyl of from 1 to 20 carbon atoms (preferably from 1 to 6 carbon atoms and more preferably methyl), alkyl of from 1 to 20 carbon atoms (preferably from 1 to 6 carbon atoms and more preferably methyl) in which each of the hydrogen atoms is independently replaced by a halide (preferably a fluoride or a chloride), alkenyl of from 2 to 20 carbon atoms, alkynyl of from 1 to 20 carbon atoms, alkoxy of from 1 to 6 carbon atoms, alkylthio of from 1 to 6 carbon atoms, $C_3$–$C_8$ cycloalkyl, phenyl, halogen, NH$_2$, $C_1$–$C_6$ -alkylamino, $C_1$–$C_6$ -dialkylamino, and phenyl which may be substituted with from 1 to 5 halogen atoms and/or $C_1$–$C_4$ alkyl groups. (This definition of "aryl" also applies to the aryl groups in "aryloxy" and "aralkyl".) Thus, phenyl may be substituted from 1 to 5 times and naphthyl may be substituted from 1 to 7 times (preferably any aryl group, if substituted, is substituted from 1 to 3 times) with one of the above substituents. More preferably, "aryl" refers to phenyl, naphthyl, phenyl substituted from 1 to 5 times with fluorine or chlorine, and phenyl substituted from 1 to 3 times with a substituent selected from the group consisting of alkyl of from 1 to 6 carbon atoms, alkoxy of from 1 to 4 carbon atoms and phenyl. Most preferably, "aryl" refers to phenyl and tolyl.

Specific examples of vinyl aromatic monomers that may be used to prepare the (co)polymer include, but are not limited to, styrene, p-chloromethyl styrene, divinyl benzene, vinyl naphthalene and divinyl naphthalene. Vinyl halides that may be used to prepare the graft (co)polymer include, but are not limited to, vinyl chloride, p-chloromethylstyrene, vinyl chloroacetate and vinylidene fluoride. Vinyl esters of carboxylic acids that may be used to prepare the graft (co)polymer include, but are not limited to, vinyl acetate, vinyl butyrate, vinyl 3,4-dimethoxybenzoate and vinyl benzoate.

In the context of the present invention, "heterocyclyl" refers to pyridyl, furyl, pyrrolyl, thienyl, imidazolyl, pyrazolyl, pyrazinyl, pyrimidinyl, pyridazinyl, pyranyl, indolyl, isoindolyl, indazolyl, benzofuryl, isobenzofuryl, benzothienyl, isobenzothienyl, chromenyl, xanthenyl, purinyl, pteridinyl, quinolyl, isoquinolyl, phthalazinyl, quinazolinyl, quinoxalinyl, naphthyridinyl, phenoxathiinyl, carbazolyl, cinnolinyl, phenanthridinyl, acridinyl, 1,10-phenanthrolinyl, phenazinyl, phenoxazinyl, phenothiazinyl, oxazolyl, thiazolyl, isoxazolyl, isothiazolyl, and hydrogenated forms thereof known to those in the art. Preferred heterocyclyl groups include pyridyl, furyl, pyrrolyl, thienyl, imidazolyl, pyrazolyl, pyrazinyl, pyrimidinyl, pyridazinyl, pyranyl and indolyl, the most preferred heterocyclyl group being pyridyl. Accordingly, suitable vinyl heterocyclyls to be used as a monomer in the present invention include 2-vinyl pyridine, 4-vinyl pyridine, 2-vinyl pyrrole, 3-vinyl pyrrole, 2-vinyl oxazole, 4-vinyl oxazole, 5-vinyl oxazole, 2-vinyl thiazole, 4-vinyl thiazole, 5-vinyl thiazole, 2-vinyl imidazole, 4-vinyl imidazole, 3-vinyl pyrazole, 4-vinyl pyrazole, 3-vinyl pyridazine, 4-vinyl pyridazine, 3-vinyl isoxazole, 3-vinyl isothiazoles, 2-vinyl pyrimidine, 4-vinyl pyrimidine, 5-vinyl pyrimidine, and any vinyl pyrazine, the most preferred being 2-vinyl pyridine. The vinyl heterocyclyls mentioned above may bear one or more (preferably 1 or 2) $C_1$–$C_6$ alkyl or alkoxy groups, cyano groups, ester groups or halogen atoms, either on the vinyl group or the heterocyclyl group, but preferably on the heterocyclyl group. Further, those vinyl heterocyclyls which, when unsubstituted, contain an N—H group may be protected at that position with a conventional blocking or protecting group, such as a $C_1$–$C_6$ alkyl group, a tris-$C_1$–$C_6$ alkylsilyl group, an acyl group of the formula $R^{13}$ CO (where $R^{13}$ is alkyl of from 1 to 20 carbon atoms, in which each of the hydrogen atoms may be independently replaced by halide, preferably fluoride or chloride), alkenyl of from 2 to 20 carbon atoms (preferably vinyl), alkynyl of from 2 to 10 carbon atoms (preferably acetylenyl), phenyl which may be substituted with from 1 to 5 halogen atoms or alkyl groups of from 1 to 4 carbon atoms, or aralkyl (aryl-substituted alkyl, in which the aryl group is phenyl or substituted phenyl and the alkyl group is from 1 to 6 carbon atoms), etc. (This definition of "heterocyclyl" also applies to the heterocyclyl groups in "heterocyclyloxy" and "heterocyclic ring.")

More specifically, preferred monomers include, but are not limited to, styrene, p-chloromethylstyrene, vinyl chloroacetate, acrylate and methacrylate esters of $C_1$–$C_{20}$ alcohols, isobutene, 2-(2-bromopropionoxy) ethyl acrylate, acrylonitrile, and methacrylonitrile.

As used herein, by "allylic" and "allylic monomer(s)" is meant monomers or stabilizing groups (SG) containing substituted and/or unsubstituted allylic functionality, i.e., one or more radicals represented by the following general formula X,

 (X)

wherein $R^{14}$ is hydrogen, halogen or a $C_1$–$C_4$ alkyl group. Most commonly, $R^{14}$ is hydrogen or methyl and, consequently, general formula X represents the unsubstituted (meth)allyl radical. Examples of allylic monomers include, but are not limited to, (meth)allyl ethers, such as methyl (meth)allyl ether and (meth)allyl glycidyl ether; allyl esters of carboxylic acids, such as (meth)allyl acetate, (meth)allyl butyrate, (meth)allyl 3,4-dimethoxybenzoate and (meth)allyl benzoate.

Other ethylenically unsaturated radically polymerizable monomers that may be used to prepare the (co)polymer include, but are not limited to, cyclic anhydrides, e.g., maleic anhydride, 1-cyclopentene-1,2-dicarboxylic anhydride and itaconic anhydride; esters of acids that are unsaturated but do not have α,β-ethylenic unsaturation, e.g., methyl ester of undecylenic acid; diesters of ethylenically unsaturated dibasic acids, e.g., di($C_1$–$C_4$ alkyl)ethyl maleates; maleimide and N-substituted maleimides.

In one embodiment of the present invention, the monomer includes a hydrophobic residue of a monomer selected from an oxirane functional monomer reacted with a carboxylic acid selected from the group consisting of aromatic carboxylic acids, polycyclic aromatic carboxylic acids, aliphatic carboxylic acids having from 6 to 20 carbon atoms and mixtures thereof; $C_6$–$C_{20}$ alkyl (meth)acrylates, e.g., including those as previously recited herein; aromatic (meth)acrylates, e.g., phenyl (meth)acrylate, p-nitrophenyl (meth)acrylate and benzyl (meth)acrylate; polycyclicaromatic (meth)acrylates, e.g., 2-naphthyl (meth)acrylate; vinyl esters of carboxylic acids, e.g., hexanoic acid vinyl ester and decanoic acid vinyl ester; N,N-di($C_1$–$C_8$ alkyl) (meth)acrylamides; maleimide; N—($C_1$–$C_{20}$ alkyl) maleimides; N—($C_3$–$C_8$ cycloalkyl) maleimides; N-(aryl) maleimides; and mixtures thereof. Examples of N-substituted maleimides include, but are not limited to, N—($C_1$–$C_{20}$ linear or branched alkyl) maleimides, e.g., N-methyl maleimide, N-tertiary-butyl maleimide, N-octyl maleimide and N-icosane maleimide; N—($C_3$–$C_8$ cycloalkyl) maleimides, e.g., N-cyclohexyl maleimide; and N-(aryl) maleimides, e.g., N-phenyl maleimide, N—($C_1$–$C_9$ linear or branched alkyl substituted phenyl) maleimide, N-benzyl maleimide and N—($C_1$–$C_9$ linear or branched alkyl substituted benzyl) maleimide.

The oxirane functional monomer or its residue that is reacted with a carboxylic acid may be selected from, for example, glycidyl (meth)acrylate, 3,4-epoxycyclohexylmethyl(meth)acrylate, 2-(3,4-epoxycyclohexyl)ethyl(meth)acrylate, allyl glycidyl ether and mixtures thereof. Examples of carboxylic acids that may be reacted with the oxirane functional monomer or its residue include, but are not limited to, para-nitrobenzoic acid, hexanoic acid, 2-ethyl hexanoic acid, decanoic acid, undecanoic acid and mixtures thereof.

The monomer containing at least one polar group may be present in an amount of 5 to 100 wt % by weight based on the total amount of monomers. A preferred amount of the monomer containing at least one polar group is 10 to 100 wt %; the most preferred amount is 20 to 100 wt % based on the total amount of monomers. This is particularly important in the case of acrylonitrile because an amount of at least 20 wt % assures solvent resistance properties of the resulting (co)polymer A.

A particular advantage of the controlled radical polymerization of the present invention is that carboxylic acid containing monomers can be polymerized directly. In other controlled polymerization methods (ATRP, anionic, etc.) the carboxylic acid functionality on a monomer must be blocked prior to polymerization and then unblocked after polymerization. The present method does not require blocking of such monomers.

Examples of carboxylic acid functional monomers include, but are not limited to, (meth)acrylic acid, maleic acid, fumaric acid and undecylenic acid. The monomer may be a residue of a precursor of a carboxylic acid functional monomer that is converted to a carboxylic acid residue after completion of the controlled radical polymerization, e.g., maleic anhydride, di($C_1$–$C_4$ alkyl) maleates and $C_1$–$C_4$ alkyl (meth)acrylates. For example, residues of maleic anhydride can be converted to diacid residues, ester/acid residues or amide/acid residues by art-recognized reactions with water, alcohols or primary amines, respectively. Residues of $C_1$–$C_4$ alkyl (meth)acrylates, such as t-butyl (meth)acrylate, can be converted to (meth)acrylic acid residues by art-recognized ester hydrolyzation methods, which typically involve the concurrent removal of an alcohol, such as t-butanol by vacuum distillation. Salts of carboxylic acid functional monomers include, for example, salts of (meth)acrylic acid and primary, secondary or tertiary amines, such as, butyl amine, dimethyl amine and triethyl amine.

Amine functional monomers include, for example, amino ($C_2$–$C_4$ alkyl) (meth)acrylates, e.g., 2-aminoethyl (meth)acrylate, 3-aminopropyl (meth)acrylate and 4-aminobutyl (meth)acrylate; N—($C_1$–$C_4$ alkyl)amino($C_2$–$C_4$ alkyl) (meth)acrylates, e.g., N-methyl-2-aminoethyl (meth)acrylate; and N,N-di($C_1$–$C_4$ alkyl)amino($C_2$–$C_4$ alkyl) (meth)acrylates, e.g., N,N-dimethyl-2-aminoethyl (meth)acrylate. The monomer may also comprise residues of salts of amine functional monomers, e.g., salts of those amine functional monomers as recited previously herein. Salts of the amine functional monomer residues may be formed by mixing a carboxylic acid, e.g., lactic acid, with the (co)polymer after completion of controlled radical polymerization.

As described above, the (co)polymer may have nonionic moieties, ionic moieties and combinations thereof. In an embodiment of the present invention, the ethylenically unsaturated monomers can be selected from, for example, poly(alkylene glycol) (meth)acrylates; $C_1$–$C_4$ alkoxy poly(alkylene glycol) (meth)acrylates; hydroxyalkyl (meth)acrylates having from 2 to 4 carbon atoms in the alkyl group; N-(hydroxy $C_1$–$C_4$ alkyl) (meth)acrylamides, e.g., N-hydroxymethyl (meth)acrylamide and N-(2-hydroxyethyl) (meth)acrylamide; N,N-di-(hydroxy $C_1$–$C_4$ alkyl) (meth)acrylamides (e.g., N,N-di(2-hydroxyethyl) (meth)acrylamide); carboxylic acid functional monomers; salts of carboxylic acid functional monomers; amine functional monomers; salts of amine functional monomers; and mixtures thereof.

Poly(alkylene glycol) (meth)acrylates and $C_1$–$C_4$ alkoxy poly(alkylene glycol) (meth)acrylates are prepared by known methods. For example, (meth)acrylic acid or hydroxyalkyl (meth)acrylate, e.g., 2-hydroxyethyl (meth)acrylate, may be reacted with one or more alkylene oxides, e.g., ethylene oxide, propylene oxide and butylene oxide. Alternatively, an alkyl (meth)acrylate may be transesterified with a $C_1$–$C_4$ alkoxy poly(alkylene glycol), e.g., methoxy poly(ethylene glycol). Examples of poly(alkylene glycol) (meth)acrylates and $C_1$–$C_4$ alkoxy poly(alkylene glycol) (meth)acrylates include poly(ethylene glycol) (meth)acrylate and methoxy poly(ethylene glycol) (meth)acrylate, the poly(ethylene glycol) moiety of each having a molecular weight of from 100 to 800. An example of a commercially available $C_1$–$C_4$ alkoxy poly(alkylene glycol) (meth)acrylate is methoxy poly(ethylene glycol) 550 methacrylate monomer from Sartomer Company, Inc. Preferred hydroxy functional monomer are hydroxyalkyl (meth)acrylates having from 2 to 20 carbon atoms in the alkyl group; epoxide functional ethylenically unsaturated radically polymerizable monomers, which are hydrolyzed; hydroxyalkyl (meth)acrylates having from 2 to 20 carbon atoms in the alkyl group, which are reacted with a lactone; beta-hydroxy ester functional (meth)acrylates, which are the reaction product of (i) (meth)acrylic acid and a glycidyl ester of a saturated monocarboxylic acid having from 4 to 26 carbon atoms, or (ii) glycidyl (meth)acrylate and a saturated monocarboxylic acid having from 4 to 26 carbon atoms; and mixtures thereof.

The present invention is also directed to a non-random copolymer of general formula (XI):

 (XI)

where A and B are different compositions of ethylenically unsaturated monomers; p is an integer from 1 to 1,000; s is an integer from 0 to 1,000; t is an integer from 1 to 100; and φ is a residue from the iniferter initiator of the present invention. The residue φ typically has the structure of general formula XII:

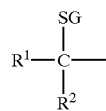 (XII)

where $R^1$ is selected from the group consisting of $C_1$–$C_{20}$ alkyl, cyclic, heterocyclic or alkynol; $R^2$ is selected from the group consisting of H and $C_1$–$C_4$ alkyl and SG is a radical stabilizing group as discussed above.

In an embodiment of the present invention, the (co)polymer can contain a segment that includes carboxylic acid functional monomers selected from (meth)acrylic acid, maleic anhydride, maleic acid, di($C_1$–$C_4$ alkyl) maleates, itaconic acid, mono or di($C_1$–$C_4$ alkyl) itaconates, and mixtures thereof. In a still further embodiment of the present invention, the (co)polymer segment is a residue of amine functional monomers selected from amino($C_2$–$C_4$ alkyl) (meth)acrylates, N—($C_1$–$C_4$ alkyl)amino($C_2$–$C_4$ alkyl) (meth)acrylates, N,N-di($C_1$–$C_4$ alkyl)amino($C_2$–$C_4$ alkyl) (meth)acrylates and mixtures thereof.

The (co)polymer also may contain a segment that contains cationic moieties selected from ammonium, sulphonium and phosphonium. Ammonium, sulphonium and phosphonium moieties may be introduced into the (co)polymer by means known to the skilled artisan. For example, when the (co)polymer contains a residue of N,N-dimethyl-2-aminoethyl (meth)acrylate, the N,N-dimethylamino moieties may be converted to ammonium moieties by mixing an acid, e.g., lactic acid, with the polymer.

Further, the (co)polymer also may contain a segment that contains residues of oxirane functional monomers, such as glycidyl (meth)acrylate. The oxirane group may be left as is or it may be used to introduce sulphonium or phosphonium moieties into the polymer. Sulphonium moieties may be introduced into the polymer by reaction of the oxirane groups with thiodiethanol in the presence of an acid, such as lactic acid. Reaction of the oxirane groups with a phosphine, e.g., triphenyl phosphine or tributyl phosphine, in the presence of an acid, such as lactic acid, results in the introduction of phosphonium moieties into the graft (co)polymer.

Additionally, the (co)polymer may contain a segment that contains residues of hydroxy functional monomers, such as an hydroxyalkyl(meth)acrylate. Examples of hydroxyalkyl (meth)acrylates include hydroxyethyl(meth)acrylate and hydroxy(propyl)methacrylate.

The non-random copolymer of the present invention can have any number of monomers and monomer blocks as depicted by general structure XIII:

 (XIII)

where A, B, C and W represent different compositions of ethylenically unsaturated monomers; p is an integer from 1 to 1,000; s, q and r are independently integers from 0 to 1,000; t is an integer from 1 to 100; and φ is a residue from the iniferter initiator as defined above.

Referring to general structure XI, when containing more than one type or species of monomer residue, the A- and B-blocks may each have at least one of block, e.g., di-block and tri-block, alternating and gradient architectures. Gradient architecture refers to a sequence of different monomer residues that changes gradually in a systematic and predictable manner along the polymer backbone. For purposes of illustration, an A-block containing 6 residues of methyl methacrylate (MMA) and 6 residues of glycidyl methacrylate (GMA), for which p is 12, may have di-block, tetra-block, alternating and gradient architectures as represented in general formulas XIV, XV, XVI, and XVII.

(XIV) Di-Block Architecture
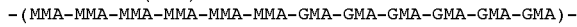

(XV) Tetra-Block Architecture
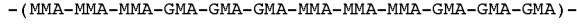

(XVI) Alternating Architecture
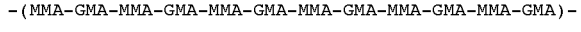

(XVII) Gradient Architecture
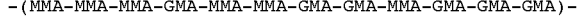

The B-block may be described in a manner similar to that of the A-block.

The order in which monomer residues occur along the backbone of the block copolymer typically is determined by the order in which the corresponding monomers are fed into the vessel in which the controlled radical polymerization is conducted. For example, the monomers that are incorporated as residues in the A-block of the block copolymer are generally fed into the reaction vessel prior to those monomers that are incorporated as residues in the B-block.

During formation of the A- and B-blocks, if more than one monomer is fed into the reaction vessel at a time, the relative reactivities of the monomers typically determines the order in which they are incorporated into the living polymer chain. Gradient sequences of monomer residues within the A- and B-blocks can be prepared by the controlled radical polymerization of the present invention by (a) varying the ratio of monomers fed to the reaction medium during the course of the polymerization, (b) using a monomer feed containing monomers having different rates of polymerization, or (c) a combination of (a) and (b).

The (co)polymer of the present invention typically has a number average molecular weight (Mn) of from 500 to 1,000,000, preferably from 700 to 100,000 and most preferably from 800 to 10,000, as determined by gel permeation chromatography using polystyrene standards. The molecular weight distribution or polydispersity index (weight average molecular weight divided by the number average molecular weight, Mw/Mn) of the (co)polymer typically is less than 2.5, preferably less than 2.0, more preferably less than 1.8 and most preferably less than 1.5.

The (co)polymers of the present invention can be used without limitation, in film-forming compositions, as rheology modifiers, with pigment or ink dispersants, in gel matrices and with molding resins.

The (co)polymers of the present invention may be used in coatings. In a preferred embodiment, the coating is a thermosetting resin composition. The thermosetting coating composition of the present invention may be in the form of liquid coating compositions, examples of which include aqueous and solvent-based coating compositions and electrodepositable coating compositions. The present thermosetting coating composition may also be in the form of a co-reactable solid particulate composition, such as a powder coating composition. Regardless of the form, the present thermosetting coating composition may be pigmented or clear, and may be used alone or in combination as primers, basecoats or topcoats.

When used in thermosetting and coating compositions, the (co)polymers of the present invention, prepared using a monofunctional iniferter, have several advantages compared with (co)polymers prepared by other controlled polymerization techniques. For example, certain functional monomers, such as carboxylic acid functional monomers, may be polymerized directly, rather than having to use time consuming and expensive "blocking" and "deblocking" steps to prevent the carboxylic acid group from reacting with the initiator and effectively ending polymerization. The present method provides excellent controlled polymerization using such monomers directly, better, more predictable placement of the functional monomer and no post polymerization removal of the blocking agent.

Compared to atom and group transfer controlled radical polymerization techniques, the present monofunctional iniferter method provides several advantages. First, potentially corrosive halides are not used. This provides the ability to use a less expensive and broader range of materials of construction for manufacturing, storing, shipping and utilizing the (co)polymer of the present invention. Second, transition metals and special ligands, which must be removed after polymerization, are not used. Any residual from these materials can potentially cause degradation and discoloration of the eventual coating. Finally, the range of monomers that can be employed include any radically polymerizable compound, rather than the limited list that can be used with atom and group radical polymerization techniques.

Polymers prepared by ionic (anionic, cationic, etc.) polymerization techniques are even more restricted as to the monomers that can be used and the conditions that may be employed than the atom/group radical polymerization techniques.

Compared to the prior art, multifunctional iniferter methodologies, the present monofunctional iniferter provides advantages in coating compositions. First and foremost, the present (co)polymers do not contain the bulky, multifunctional initiator groups required in the prior art iniferter methods. When used in coating compositions, the smaller end groups of the present (co)polymers provide for lower viscosity, better flow properties, better leveling and better storage stability than similar (co)polymers prepared using the multifunctional iniferters of the prior art methods. Some of the practical benefits of these properties are lower VOC (volatile organic carbon) in liquid coatings as well as better flow and leveling in powder coatings and electrodeposition coatings. The iniferters of the present invention are also easier and less expensive to make, easier to use and can be prepared from commonly and commercially available starting materials.

The superior coating composition properties as well as the ease and less expense to prepare and use properties make the present monofunctional iniferter polymerization method and the resulting polymer compositions a significant advancement solving the problems and deficiencies of prior art controlled polymerization methods.

In an embodiment of the present invention, the coating composition is a co-reactable solid, particulate mixture of (a) a first reactant having functional groups and (b) a second reactant having functional groups, which may be the (co)polymer of the present invention. The second reactant (b) contains functional groups that can react with the functional groups of the first reactant. Referring to general structure I, when the second reactant is the present (co)polymer, it is characterized in that A and B are different compositions of ethylenically unsaturated monomers, with B including functional monomers with a functional group selected from the group consisting of oxirane, hydroxy and carboxylic acid.

Not wishing to be limited to any one set of functional groups, there are several examples of co-reactive functional groups that can be used in the present invention. The first or crosslinking reactant has a functional group different than that contained in the second reactant and is co-reactive toward the functional groups of the second reactant and can be, but is not limited to, epoxy or oxirane; carboxylic acid; hydroxy; polyol; isocyanate; capped isocyanate; amine; aminoplast and beta-hydroxyalkylamide. The functional groups of the second reactant can be, but are not limited to, epoxy, or oxirane; carboxylic acid; hydroxy; amide; oxazoline; aceto acetate; isocyanate; or carbamate.

Curable powder coating compositions typically comprise a polymer reactant having functional groups, for example, an epoxide functional polymer reactant, and a first reactant having functional groups that act as a crosslinking agent. The first reactant having functional groups has functional groups that are co-reactive towards and can form covalent bonds with the functional groups of the second reactant, a functionalized (co)polymer of the present invention. The first and second reactants of the curable powder coating composition may each independently comprise one or more functional species, and are each present in amounts sufficient to provide cured coatings having a desirable combination of physical properties, such as smoothness, clarity, solvent resistance and hardness.

Not wishing to be limited to any one set of functional groups, there are several examples of co-reactive functional groups that can be used in the present invention. One example of curable powder coating compositions from which the compositions of the present invention may be selected include powder coating compositions comprising an epoxide functional polymer as the first reactant and an epoxide reactive crosslinking agent, such as a carboxylic acid functional crosslinking agent, as the second reactant. Examples of this type of powder coating are disclosed in U.S. Pat. Nos. 5,407,707, 5,663,240 and 5,710,214. Another example is a powder coating composition comprising a carboxylic acid functional polymer as the first reactant and a beta-hydroxyalkylamide functional crosslinking agent as the second reactant, such as those disclosed in U.S. Pat. Nos. 4,889,890, 4,937,288, 5,098,955, 5,202,382 and 5,214,101. A further example is a powder coating composition comprising an hydroxy functional polymer as the first reactant and capped isocyanate functional crosslinking agent as the second reactant, such as those described in U.S. Pat. Nos. 4,997,900, 5,439,896, 5,508,337, 5,510,444, 5,554,692 and 5,777,061.

Polymers comprising the majority of the binder resins in curable powder coating compositions are solid at room temperature, typically having differential scanning calorimetry (DSC) derived glass transition midpoint values of from 30° C. to 80° C., preferably from 35° C. to 50° C. These polymers also typically have number average molecular weights (Mn) of from 500 to 15,000.

Classes of epoxide functional polymers from which the (co)polymer reactant of the curable powder coating compositions of the present invention may be selected include, but are not limited to, epoxide functional vinyl polymers, of which epoxide functional (meth)acrylic polymers, epoxide functional polyethers, epoxide functional polyesters and combinations thereof are included. Epoxide functional vinyl polymers can be prepared by the controlled free radical polymerization method of the present invention.

Epoxide functional vinyl polymers can be prepared using the controlled polymerization method of the present invention and are typically prepared by polymerizing one or more epoxide functional ethylenically unsaturated monomers with a non-epoxide functional ethylenically unsaturated monomer. Examples of non-epoxide functional ethylenically unsaturated monomers include, but are not limited to, methyl (meth)acrylate, isobornyl (meth)acrylate, butyl (meth)acrylate and styrene. Examples of epoxide functional ethylenically unsaturated monomers that may be used in the preparation of epoxide functional vinyl polymers include, but are not limited to, glycidyl (meth)acrylate, 3,4-epoxycyclohexylmethyl (meth)acrylate, 2-(3,4-epoxycyclohexyl)ethyl (meth)acrylate and allylglycidyl ether. Examples of ethylenically unsaturated monomers that are free of epoxide functionality include those described in U.S. Pat. No. 5,407,707 at column 2, lines 17 through 56.

In a preferred embodiment of the present invention, the epoxide functional vinyl polymer, prepared using the method of the present invention, is prepared from a majority of (meth)acrylate monomers and is referred to herein as an "epoxide functional (meth)acrylic polymer." The epoxide functional vinyl polymer typically has a number average molecular weight of from 500 to 5,000, preferably from 800 to 2,500.

Epoxide functional polyethers can also be used in the present invention. Epoxide functional polyethers can be prepared from a hydroxyl functional monomer, such as a diol, and an epoxide functional monomer, and/or a monomer having both hydroxy and epoxide functionality. Suitable epoxide functional polyethers include, but are not limited to, those based on 4,4'-isopropylidenediphenol (bisphenol A), a specific example of which is EPON® RESIN 2002 available commercially from Shell Chemicals.

Epoxide functional polyesters can be used as the first reactant having functional groups and can be prepared by art-recognized methods, which typically include first preparing a hydroxyl functional polyester that is then reacted with epichlorohydrin. Polyesters having hydroxyl functionality may be prepared by art-recognized methods, which include reacting carboxylic acids (and/or esters thereof) having acid (or ester) functionalities of at least 2, and polyols having hydroxyl functionalities of at least 2. As is known to those of ordinary skill in the art, the molar equivalents ratio of carboxylic acid groups to hydroxyl groups of the reactants is selected such that the resulting polyester has hydroxy functionality and the desired molecular weight.

Examples of multifunctional carboxylic acids useful in preparing hydroxyl functional polyesters are known to the skilled artisan and include, for example, phthalic acid, tetrahydrophthalic acid, hexahydrophthalic acid, isophthalic acid and terephthalic acid. Examples of polyols useful in preparing hydroxy functional polyesters are known to those skilled in the art and include, for example, glycerin, trimethylolpropane, ethylene glycol and 1,4-dimethylolcyclohexane.

Epoxide reactive crosslinking agents that are used in thermosetting powder coating compositions comprising epoxide functional polymers may have functional groups selected from hydroxyl, thiol, primary amines, secondary amines, carboxyl and mixtures thereof. Useful epoxide reactive crosslinking agents having amine functionality include, for example, dicyandiamide and substituted dicyandiamides. Preferably, the epoxide reactive crosslinking agent has carboxylic acid groups. In one embodiment of the present invention, the epoxide reactive crosslinking agent has carboxylic acid functionality and is substantially crystalline. By "crystalline" is meant that the co-reactant contains at least some crystalline domains, and correspondingly may contain some amorphous domains. While not necessary, it is preferred that the epoxide reactive crosslinking agent have a melt viscosity less than that of the epoxy functional polymer (at the same temperature). As used herein, by "epoxide reactive crosslinking agent" is meant that the epoxide reactive crosslinking agent has at least two functional groups that are reactive with epoxide functionality.

Other suitable carboxylic acid functional crosslinking agents include those represented by the following general formula XVIII:

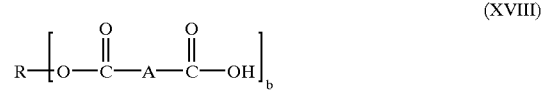

(XVIII)

wherein R is a residue from a polyol, A is a divalent linking group having from 1 to 10 carbon atoms, and b is an integer of from 2 to 10. Examples of polyols from which R of general formula XVIII may be derived include, but are not limited to, ethylene glycol, di(ethylene glycol), trimethylolethane, trimethylolpropane, pentaerythritol, di-trimethylolpropane, di-pentaerythritol and mixtures thereof. Divalent linking groups from which A may be selected include, but are not limited to, methylene; ethylene; propylene; isopropylene; butylene; pentylene; hexylene; heptylene; octylene; nonylene; decylene; cyclohexylene, such as 1,2-cyclohexylene; substituted cyclohexylene, such as 4-methyl-1,2-cyclohexylene; phenylene, such as 1,2-phenylene; and 4-carboxylic acid-1,2-phenylene. The divalent linking group A is preferably aliphatic.

The crosslinking agent represented by general formula XVIII is typically prepared from a polyol and a dibasic or cyclic anhydride. For example, trimethylol propane and hexahydro-4-methylphthalic anhydride are reacted together in a molar ratio of 1:3, respectively, to form a carboxylic acid functional crosslinking agent. This particular crosslinking agent can be described with reference to general formula XVIII as follows, R is the residue of trimethylol propane, A is the divalent linking group 4-methyl-1,2-cyclohexylene, and b is 3. Carboxylic acid functional crosslinking agents described herein with reference to general formula XVIII are meant to include also any unreacted starting materials and/or co-products, for example oligomeric species, resulting from their preparation and contained therein.

Curable powder coating compositions comprising epoxide functional (co)polymer and epoxide reactive crosslinking agent usually also include one or more cure catalysts for catalyzing the reaction between the reactive functional groups and the epoxide groups of the polymer. Examples of cure catalysts for use with acid functional crosslinking agents include tertiary amines, such as methyl dicocoamine, and tin compounds such as triphenyl tin hydroxide. The curing catalyst is typically present in the curable powder coating composition in an amount of less than 5 percent by weight, preferably from 0.25 to 2.0 percent by weight, based on the total resin solids weight of the composition.

Curable powder coating compositions that include epoxide functional (co)polymers and epoxide reactive crosslinking agents typically have present therein epoxide functional (co)polymers in an amount of from 60 to 95 percent by weight based on the total resin solids weight of the composition, preferably from 70 to 85 percent by weight, based on the total resin solids weight composition. The epoxide reactive crosslinking agent is typically present in the curable powder coating composition in an amount corresponding to the balance of these recited ranges, 5 to 40, preferably 15 to 30 percent by weight. The equivalent ratio of epoxide equivalents in the epoxide functional (co) polymer to the equivalents of reactive functional groups is typically from 0.5:1 to 2:1, preferably from 0.8:1 to 1.5:1. Curable powder coating compositions comprising carboxylic acid functional crosslinking agent are typically cured at a temperature of from 121° C. to 177° C. over a period of from 10 to 60 minutes.

Curable powder coating compositions comprising carboxylic acid functional (co)polymer as the second reactant (b) and beta-hydroxyalkylamide functional crosslinking agent as the first reactant (a) are also useful in the present invention. Classes of useful carboxylic acid functional (co) polymers include, but are not limited to, carboxylic acid functional vinyl polymers, carboxylic acid functional polyesters, carboxylic acid functional polyurethanes, and mixtures thereof.

As discussed above, carboxylic acid functional vinyl (co)polymers can be prepared by the controlled radical polymerization method of the present invention. The carboxylic acid functional vinyl (co)polymer is typically prepared by polymerizing one or more carboxylic acid functional ethylenically unsaturated monomers, such as (meth) acrylic acid, with one or more ethylenically unsaturated monomers that are free of carboxylic acid functionality, such as, ethyl (meth)acrylate, isobornyl (meth)acrylate, butyl (meth)acrylate and styrene. Alternatively, the carboxylic acid functional vinyl (co)polymer that is then reacted with a cyclic anhydride, such as succinic anhydride.

Carboxylic acid functional polyurethanes may be prepared by reacting polyols and polyisocyanates so as to form a polyurethane polyol, which is then reacted with polycarboxylic acid or cyclic anhydride to introduce free carboxylic acid into the reaction product. Carboxylic functional polyurethane that may be used in the curable powder coating compositions, which include beta-hydroxyalkylamide crosslinking agents are described in further detail in U.S. Pat. No. 4,937,288 at column 6, lines 13 through 39.

One or more beta-hydroxyalkylamide crosslinking agents may be present in the curable powder coating compositions comprising carboxylic acid functional (co)polymer as the second reactant. The beta-hydroxyalkylamide crosslinking agent can be represented by the following general formula XIX:

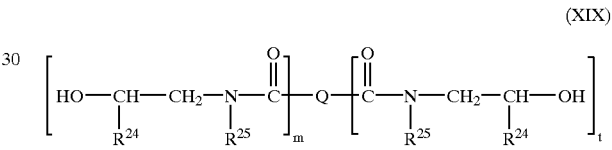

(XIX)

where $R^{24}$ is H or $C_1$–$C_5$ alkyl; $R^{25}$ is H or $C_1$–$C_5$ alkyl or a structure as defined by structure XX:

(XX)

for which $R^{24}$ is as described above, Q is a chemical bond or monovalent or polyvalent organic radical derived from saturated, unsaturated or aromatic hydrocarbon radicals including substituted hydrocarbon radicals containing from 2 to 20 carbon atoms, m equals 1 or 2, t equals 0 to 2, and m+t is at least 2. Preferably, Q is an alkylene radical —$(CH_2)_x$— where x is equal to 2 to 12, preferably 4 to 10; m is equal to 1 to 2, t is equal to 0 to 2, and m+t is at least 2, preferably greater than 2 up to and including 4. The beta-hydroxyalkylamide crosslinking agent represented by general formula XVIII can be prepared by art recognized methods, as described in, for example, U.S. Pat. No. 4,937, 288 at column 7, lines 6 through 16.

Curable powder coating compositions comprising carboxylic acid functional (co)polymer and beta-hydroxyalkylamide crosslinking agent typically have present therein carboxylic acid functional (co)polymer in an amount of from 60 to 95 percent by weight, based on total resin solids weight of the composition, preferably from 80 to 90 percent by weight, based on total resin solids weight of the composition. The beta-hydroxyalkylamide crosslinking agent is typically present in the curable powder coating composition in an amount corresponding to the balance of the recited ranges, 5 to 40, preferably 10 to 20 percent by weight.

To achieve a suitable level of cure, the equivalent ratio of hydroxy equivalents in the beta-hydroxyalkylamide crosslinking agent to carboxylic acid equivalents in the carboxylic acid functional (co)polymer is preferably from 0.6:1 to 1.6:1, preferably from 0.8:1 to 1.3:1. Ratios outside the range of 0.6:1 to 1.6:1 are generally undesirable due to the resulting poor cure response associated therewith.

Curable powder coating compositions comprising carboxylic acid functional (co)polymer and beta-hydroxyalkylamide functional crosslinking agent are typically cured at a temperature of from 149° C. to 204° C. over a period of from 10 to 60 minutes.

Also useful in the present invention are curable powder coating compositions comprising hydroxy functional (co)polymer, made using the method of the present invention, and capped isocyanate functional crosslinking agent. Hydroxy functional (co)polymers that can be used in such compositions include, but are not limited to, hydroxy functional vinyl (co)polymers, hydroxy functional polyesters, hydroxy functional polyurethanes and mixtures thereof.

Vinyl (co)polymers having hydroxy functionality can be prepared by the controlled radical polymerization method of the present invention. In an embodiment of the present invention, the hydroxy functional vinyl (co)polymer is prepared from a majority of (meth)acrylic monomers and is referred to herein as a "hydroxy functional (meth)acrylic (co)polymer."

Hydroxy functional polyesters useful in curable powder coating compositions comprising capped isocyanate functional crosslinking agent can be prepared by art-recognized methods. Typically, diols and dicarboxylic acids or diesters of dicarboxylic acids are reacted in a proportion such that the molar equivalents of hydroxy groups is greater than that of carboxylic acid groups (or esters of carboxylic acid groups) with the concurrent removal of water or alcohols from the reaction medium. Hydroxy functional polyesters useful in the present invention are described in further detail in U.S. Pat. No. 5,508,337 at column 5, line 24 through column 6, line 30.

Hydroxy functional urethanes can be prepared by art-recognized methods, for example, as previously described herein. Hydroxy functional urethanes useful in the present invention are described in further detail in U.S. Pat. No. 5,510,444 at column 5, line 33 through column 7, line 61.

By "capped isocyanate crosslinking agent" is meant a crosslinking agent having two or more capped isocyanate groups that can decap (or deblock) under cure conditions, for example, at elevated temperature, to form free isocyanate groups and free capping groups. The free isocyanate groups formed by decapping of the crosslinking agent are preferably capable of reacting and forming substantially permanent covalent bonds with the hydroxy groups of hydroxy functional polymer.

It is desirable that the capping group of the capped isocyanate crosslinking agent not adversely affect the curable powder coating composition upon decapping from the isocyanate, for example, when it becomes a free capping group. For example, it is desirable that the free capping group neither become trapped in the cured film as gas bubbles nor excessively plasticize the cured film. Capping groups useful in the present invention preferably have the characteristics of being nonfugitive or capable of escaping substantially from the forming coating prior to its vitrification.

Classes of capping groups of the capped isocyanate crosslinking agent may be selected from: hydroxy functional compounds, such as ethylene glycol butyl ether, phenol and p-hydroxy methylbenzoate; 1H-azoles, such as 1H-1,2,4-triazole and 1H-2,5-dimethyl pyrazole; lactams, such as e-caprolactam and 2-pyrolidone; ketoximes, such as 2-propane oxime and 2-butanone oxime and those described in U.S. Pat. No. 5,508,337 at column 7, lines 11 through 22, the disclosure of which is incorporated herein by reference. Other capping groups include morpholine, 3-aminopropyl morpholine and n-hydroxy phthalimide.

The isocyanate or mixture of isocyanates of the capped isocyanate crosslinking agent has two or more isocyanate groups and is preferably solid at room temperature. Examples of suitable isocyanates that may be used to prepare the capped isocyanate crosslinking agent include monomeric diisocyanates, such as α,α'-xylene diisocyanate, α,α,α',α'-tetramethylxylylene diisocyanate and 1-isocyanato-3-isocyanatomethyl-3,5,5-trimethylcyclohexane (isophorone diisocyanate or IPDI), and dimers and trimers of monomeric diisocyanates containing isocyanurate, uretidino, biuret or allophanate linkages, such as the trimer of IPDI. Isocyanates that are useful in the present invention are described in further detail in U.S. Pat. No. 5,777,061 at column 3, line 4 through column 4, line 40, the disclosure of which is incorporated herein by reference. A particularly preferred isocyanate is a trimer of 1-isocyanato-3,3,5-trimethyl-5-isocyanatomethylcyclohexane.

The capped isocyanate crosslinking agent may also be selected from oligomeric capped isocyanate functional adducts. As used herein, by "oligomeric capped polyisocyanate functional adduct" is meant a material that is substantially free of polymeric chain extension. Oligomeric capped polyisocyanate functional adducts can be prepared by art-recognized methods from, for example, a compound containing three or more active hydrogen groups, such as trimethylolpropane (TMP); and an isocyanate monomer, such as 1-isocyanato-3,3,5-trimethyl-5-isocyanatomethylcyclohexane (IPDI) in a molar ratio of 1:3 respectively. In the case of TMP and IPDI, by employing art-recognized starved feed and/or dilute solution synthesis techniques, an oligomeric adduct having an average isocyanate functionality of 3 can be prepared ("TMP-3IPDI"). The three free isocyanate groups per TMP-3IPDI adduct are then capped with a capping group, such as 2-propane oxime or e-caprolactam.

Another isocyanate useful in the present invention is TMDI, which is a mixture of 2,4,4-trimethyl hexamethylene diisocyanate and 2,2,4-trimethyl hexamethylene diisocyanate.

To catalyze the reaction between the isocyanate groups of the capped polyisocyanate crosslinking agent and the hydroxy groups of the hydroxy functional polymer, one or more catalysts are typically present in the powder coating composition in amounts of from, for example, 0.1 to 5 percent by weight, based on total resin solids of the composition. Classes of useful catalysts include metal compounds, in particular, organic tin compounds, such as tin(II) octanoate and dibutyltin(IV) dilaurate, and tertiary amines, such as diazabicyclo[2.2.2]octane. Examples of organic tin compounds and tertiary amines are described in U.S. Pat. No. 5,508,337 at column 7, lines 28 through 49, the disclosure of which is incorporated herein by reference.

Curable powder coating compositions of the present invention include those where the second reactant is selected from acid functional (co)polymers and the first reactant is a glycidyl isocyanurates and/or a bisphenol A epoxide.

Curable powder coating compositions comprising hydroxy functional polymer and capped isocyanate functional crosslinking agent typically have present therein hydroxy functional (co)polymer in an amount of from 55 to 95 percent by weight, based on total resin solids weight of the composition, preferably from 75 to 90 percent by weight based on total resin solids weight of the composition. The capped isocyanate functional crosslinking agent is typically present in the powder composition in an amount corresponding to the balance of these recited ranges, 5 to 45, preferably 10 to 25 percent by weight.

The equivalent ratio of isocyanate equivalents in the capped isocyanate crosslinking agent to hydroxy equivalents in the capped isocyanate crosslinking agent to hydroxy equivalents in the hydroxy functional (co)polymer is typically within the range of 1:3 to 3:1, preferably 1:2 to 2:1. While equivalent ratios outside of this range can be employed, that they are generally less desirable due to performance deficiencies in cured films obtained therefrom. Powder coating compositions comprising hydroxy functional polymer and capped isocyanate functional crosslinking agent are typically cured at a temperature of from 120° C. to 190° C. over a period of from 10 to 60 minutes.

Curable powder coating compositions may optionally contain additives such as waxes to improve the slip properties of the cured coating, degassing additives such as benzoin, adjuvant resin to modify and optimize coating properties, antioxidants and ultraviolet (UV) light absorbers. Examples of useful antioxidants and UV light absorbers include those available commercially from Ciba Specialty Chemicals under the trade names IRGANOX and TINUVIN. These optional additives, when used, are typically present in amounts up to 20 percent by weight, based on total weight of resin solids of the curable composition.

Curable powder coating compositions useful in the present invention are typically prepared by first dry blending the functional (co)polymer, for example epoxide functional (co)polymer; the crosslinking agent; the polymeric flow control agent and additives such as degassing agent and catalysts in a blender, such as a Henshel blade blender. The blender is operated for a period of time sufficient to result in a homogeneous dry blend of the materials charged thereto. The homogeneous dry blend is then melt blended in an extruder, such as a twin screw co-rotating extruder, operated within a temperature range sufficient to melt but not gel the components. For example, when preparing curable powder coating compositions comprising epoxide functional crosslinking agent, the extruder is typically operated within a temperature range of from 80° C. to 140° C., preferably from 100° C. to 125° C.

Optionally, curable powder coating compositions of the present invention may be melt blended in two or more steps. For example, a first melt blend is prepared in the absence of cure catalyst. A second melt blend is prepared at a lower temperature, from a dry blend of the first melt blend and the cure catalyst. The melt blend curable powder coating composition is typically milled to an average particle size of from, for example, 15 to 30 microns.

In another embodiment of the present invention, the (co)polymer may be used in a thermosetting composition as a flow control agent, a resinous binder or as an additive in combination with a separate resinous binder, which may be prepared using the method of the present invention. Referring to general structure I, the present (co)polymer can be characterized in that A and B are different compositions of ethylenically unsaturated monomers, with B including functional monomers with a functional group selected, for example, from oxirane, hydroxy or carboxylic acid. When used as an additive, the non-random polymer as described herein may have low functionality (it may be monofunctional) and a correspondingly high equivalent weight. Alternatively, for other applications such as use as a reactive diluent, the additive may be highly functional with a correspondingly low equivalent weight.

The thermosetting composition of the present invention further comprises a crosslinking agent having at least two functional groups that are reactive with the functional groups of the (co)polymer reactant.

Not wishing to be limited to any one set of functional groups, there are several examples of co-reactive functional groups that can be used in the present invention. The crosslinking reactant has a functional group different than that contained in the (co)polymer reactant and is co-reactive toward the functional groups of the (co)polymer reactant and can be, but is not limited to, epoxy or oxirane; carboxylic acid; hydroxy; polyol; isocyanate; capped isocyanate; amine; aminoplast and beta-hydroxyalkylamide. The functional groups of the (co)polymer reactant can be, but are not limited to, epoxy, or oxirane; carboxylic acid; hydroxy; amide; oxazoline; aceto acetate; isocyanate; or carbamate.

The (co)polymer is typically present in the thermosetting composition of the present invention in an amount of at least 0.5 percent by weight (when used as an additive), preferably at least 10 percent by weight (when used as a resinous binder), and more preferably at least 25 percent by weight, based on the total weight of resin solids of the thermosetting composition. The thermosetting composition also typically contains functionality polymer present in an amount of less than 99.5 percent by weight, preferably less than 90 percent by weight, and more preferably less than 75 percent by weight, based on the total weight of resin solids of the thermosetting composition. The (co)polymer may be present in the thermosetting composition of the present invention in an amount ranging between any combination of these values, inclusive of the recited values.

When the (co)polymer has hydroxyl functionality, examples of suitable crosslinking agents include aminoplasts containing methylol and/or methylol ether groups and polyisocyanates.

Aminoplasts are obtained from the reaction of formaldehyde with an amine or amide. The most common amines or amides are melamine, urea, or benzoguanamine, and are preferred. However, condensates with other amines or amides can be used; for example, aldehyde condensates of glycoluril, which give a high melting crystalline product which is useful in powder coatings. While the aldehyde used is most often formaldehyde, other aldehydes such as acetaldehyde, crotonaldehyde, and benzaldehyde may be used.

The aminoplast contains methylol groups and preferably at least a portion of these groups are etherified with an alcohol to modify the cure response. Any monohydric alcohol may be employed for this purpose including methanol, ethanol, butanol, isobutanol, and hexanol.

Preferably, the aminoplasts which are used are melamine-, urea-, or benzoguanamine-formaldehyde condensates etherified with an alcohol containing from one to four carbon atoms.

Other suitable crosslinking agents for hydroxy functional (co)polymers include polyisocyanates. The polyisocyanate crosslinking agent may be a fully capped polyisocyanate with substantially no free isocyanate groups, or it may contain free isocyanate functionality. Free isocyanate groups allow for curing of the composition at temperatures as low as ambient. When the crosslinking agent contains free isocyanate groups, the film-forming composition is preferably a two-package composition (one package comprising the crosslinking agent and the other comprising the hydroxyl functional polymer) in order to maintain storage stability.

The polyisocyanate can be an aliphatic or an aromatic polyisocyanate or a mixture of the two. Diisocyanates are preferred, although higher polyisocyanates can be used in place of or in combination with diisocyanates.

Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis (cyclohexyl isocyanate). Examples of suitable aromatic diisocyanates are p-phenylene diisocyanate, diphenylmethane-4,4'-diisocyanate and 2,4- or 2,6-toluene diisocyanate. Examples of suitable higher polyisocyanates are triphenylmethane-4,4',4"-triisocyanate, 1,2,4-benzene triisocyanate and polymethylene polyphenyl isocyanate. Biurets and isocyanurates of diisocyanates, including mixtures thereof, such as the isocyanurate of hexamethylene diisocyanate, the biuret of hexamethylene diisocyanate and the isocyanurate of isophorone diisocyanate are also suitable.

Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used.

Any suitable aliphatic, cycloaliphatic, or aromatic alkyl monoalcohol or phenolic compound may be used as a capping agent for the capped polyisocyanate crosslinking agent in the composition of the present invention including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether.

Other suitable capping agents include oximes such as methyl ethyl ketoxime, acetone oxime and cyclohexanone oxime, lactams such as epsilon-caprolactam, and amines such as dibutyl amine.

When the functionality of monomer composition B is an oxirane or epoxy group, the crosslinking agent has at least two functional groups that are reactive with epoxides. The at least two functional groups are intended to include mixtures of functional groups. The functional groups that are reactive with epoxides include, but are not limited to, polyamines, polyamides, polycarboxylic acids, polyanhydrides and polyphenolic compounds.

Suitable polyamines include, but are not limited to, amine and amide functional addition polymers and oligomers typically used in film-forming compositions such as acrylic and vinyl polymers.

Suitable polycarboxylic acids include, but are not limited to, dodecanedioic acid, azelaic acid, adipic acid, 1,6-hexanedioic acid, succinic acid, sebacic acid, maleic acid, citric acid, itaconic acid, pimelic acid, aconitic acid, carboxylic acid terminated polyesters, half-esters formed from reacting an anhydride with a polyol, carboxylic acid containing polymers such as acrylic acid and methacrylic acid containing polymers, polyesters and polyurethanes, fatty diacids and mixtures thereof.

Suitable polyanhydrides include addition polymers and oligomers typically used in film-forming compositions such as acrylic and vinyl polymers. Examples include, but are not limited to, those described in U.S. Pat. Nos. 4,798,746 and 4,732,790.

When the (co)polymer has carboxylic acid functionality, the crosslinking agent is a beta-hydroxyalkylamide as described above.

The crosslinking agent is typically present in the thermosetting compositions of the present invention in an amount of at least 10 percent by weight, preferably at least 25 percent by weight, based on total resin solids weight of the composition. The crosslinking agent is also typically present in the composition in an amount of less than 90 percent by weight, preferably less than 75 percent by weight, based on total resin solids weight of the composition. The amount of crosslinking agent present in the thermosetting composition of the present invention may range between any combination of these values, inclusive of the recited values.

The equivalent ratio of functional groups in the polymer to reactive functional groups in the crosslinking agent is typically within the range of 1:0.5 to 1:1.5, preferably 1:0.8 to 1:1.2.

Usually the thermosetting composition will also preferably contain catalysts to accelerate the cure of the crosslinking agent with reactive groups on the polymer(s).

Suitable catalysts for aminoplast cure include acids such as acid phosphates and sulfonic acid or a substituted sulfonic acid. Examples include dodecylbenzene sulfonic acid, para-toluene sulfonic acid, phenyl acid phosphate, ethylhexyl acid phosphate, and the like. Suitable catalysts for isocyanate cure include organotin compounds such as dibutyltin oxide, dioctyltin oxide, dibutyltin dilaurate, and the like. The catalyst is usually present in an amount of about 0.05 to about 5.0 percent by weight, preferably about 0.25 to about 2.0 percent by weight, based on the total weight of resin solids in the thermosetting composition.

The thermosetting composition of the present invention is preferably used as a film-forming (coating) composition, and may contain adjunct ingredients conventionally used in such compositions. Optional ingredients such as, for example, plasticizers, surfactants, thixotropic agents, anti-gassing agents, organic cosolvents, flow controllers, antioxidants, UV light absorbers and similar additives conventional in the art may be included in the composition. These ingredients are typically present at up to about 40% by weight based on the total weight of resin solids.

The thermosetting composition of the present invention is typically a liquid and may be waterborne, but is usually solventborne. Suitable solvent carriers include the various esters, ethers, and aromatic solvents, including mixtures thereof, that are known in the art of coating formulation. The composition typically has a total solids content of about 40 to about 80 percent by weight.

The thermosetting composition of the present invention may contain color pigments conventionally used in surface coatings and may be used as a monocoat; that is, a pigmented coating. Suitable color pigments include, for example, inorganic pigments such as titanium dioxide, iron oxides, chromium oxide, lead chromate, and carbon black, and organic pigments such as phthalocyanine blue and phthalocyanine green. Mixtures of the above mentioned pigments may also be used. Suitable metallic pigments include in particular aluminum flake, copper bronze flake and metal oxide coated mica, nickel flakes, tin flakes, and mixtures thereof.

In general, the pigment is incorporated into the coating composition in amounts up to about 80 percent by weight based on the total weight of coating solids. The metallic pigment is employed in amounts of about 0.5 to about 25 percent by weight based on the total weight of coating solids.

As stated above, the thermosetting compositions of the present invention may be used in a method of coating a substrate comprising applying a thermosetting composition to the substrate, coalescing the thermosetting composition over the substrate in the form of a substantially continuous film, and curing the thermosetting composition.

The compositions can be applied to various substrates to which they adhere including wood, metals, glass, and plastic. The compositions can be applied by conventional means including brushing, dipping, flow coating, spraying and the like, but they are most often applied by spraying. The usual spray techniques and equipment for air spraying and electrostatic spraying and either manual or automatic methods can be used.

After application of the composition to the substrate, the composition is allowed to coalesce to form a substantially continuous film on the substrate. Typically, the film thickness will be about 0.01 to about 5 mils (about 0.254 to about 127 microns), preferably about 0.1 to about 2 mils (about 2.54 to about 50.8 microns) in thickness. The film is formed on the surface of the substrate by driving solvent, i.e., organic solvent and/or water, out of the film by heating or by an air drying period. Preferably, the heating will only be for a short period of time, sufficient to ensure that any subsequently applied coatings can be applied to the film without dissolving the composition. Suitable drying conditions will depend on the particular composition, but in general a drying time of from about 1 to 5 minutes at a temperature of about 68–250° F. (20–121° C.) will be adequate. More than one coat of the composition may be applied to develop the optimum appearance. Between coats the previously applied coat may be flashed, that is, exposed to ambient conditions for about 1 to 20 minutes.

The film-forming composition of the present invention is preferably used as the clear coat layer in a multi-component composite coating composition such as a "color-plus-clear" coating system, which includes at least one pigmented or colored base coat and at least one clear topcoat. In this embodiment, the clear film-forming composition may include the thermosetting composition of the present invention.

The film-forming composition of the base coat in the color-plus-clear system can be any of the compositions useful in coatings applications, particularly automotive applications. The film-forming composition of the base coat comprises a resinous binder and a pigment to act as the colorant. Particularly useful resinous binders are acrylic polymers, polyesters, including alkyds, and polyurethanes. Polymers prepared using atom transfer radical polymerization may also be used as resinous binders in the base coat.

The base coat compositions may be solventborne or waterborne. Waterborne base coats in color-plus-clear compositions are disclosed in U.S. Pat. No. 4,403,003, and the resinous compositions used in preparing these base coats can be used in the practice of this invention. Also, waterborne polyurethanes such as those prepared in accordance with U.S. Pat. No. 4,147,679 can be used as the resinous binder in the base coat. Further, waterborne coatings such as those described in U.S. Pat. No. 5,071,904 can be used as the base coat.

The base coat contains pigments to give it color. Suitable pigments include those discussed above. In general, the pigment is incorporated into the coating composition in amounts of about 1 to 80 percent by weight based on weight of coating solids. Metallic pigment is employed in amounts of about 0.5 to 25 percent by weight based on weight of coating solids.

If desired, the base coat composition may contain additional materials well-known in the art of formulated surface coatings, including those discussed above. These materials can constitute up to 40 percent by weight of the total weight of the coating composition.

The base coating compositions can be applied to various substrates to which they adhere by conventional means, but they are most often applied by spraying. The usual spray techniques and equipment for air spraying and electrostatic spraying and either manual or automatic methods can be used.

During application of the base coat composition to the substrate, a film of the base coat is formed on the substrate. Typically, the base coat thickness will be about 0.01 to 5 mils (0.254 to 127 microns), preferably 0.1 to 2 mils (2.54 to 50.8 microns) in thickness.

After application of the base coat to the substrate, a film is formed on the surface of the substrate by driving solvent out of the base coat film by heating or by an air drying period, sufficient to ensure that the clear coat can be applied to the base coat without the former dissolving the base coat composition, yet insufficient to fully cure the base coat. More than one base coat and multiple clear coats may be applied to develop the optimum appearance. Usually between coats, the previously applied coat is flashed.

The clear topcoat composition may be applied to the base coated substrate by any conventional coating technique such as brushing, spraying, dipping or flowing, but spray applications are preferred because of superior gloss. Any of the known spraying techniques may be employed such as compressed air spraying, electrostatic spraying and either manual or automatic methods.

After application of the clear coat composition to the base coat, the coated substrate may be heated to cure the coating layer(s). In the curing operation, solvents are driven off and the film-forming materials in the composition are crosslinked. The heating or curing operation is usually carried out at a temperature in the range of from at least ambient (in the case of free polyisocyanate crosslinking agents) to 350° F. (ambient to 177° C.) but if needed, lower or higher temperatures may be used as necessary to activate crosslinking mechanisms.

In a further embodiment of the present invention, the present (co)polymer is included in thermosetting compositions used in the electrocoating of conductive substrates. Referring to structure I, the monomer composition A includes monomers that contain active hydrogens and monomers that contain onium salt groups. The coating composition further contains curing agents, which are reactive with the active hydrogen groups of the polymer. The active hydrogen-containing polymers are prepared by the method of this invention, and have well defined polymer chain structures, molecular weights and molecular weight distributions.

The active hydrogen group-containing polymer containing onium salt groups may be present in the thermosetting compositions of the invention as a resinous binder (i.e., a film-forming polymer) or as an additive in combination with a separate resinous binder, which may be prepared either by atom transfer radical polymerization or by conventional polymerization methods. When used as an additive, for example as a reactive diluent, the active hydrogen group-containing polymer as described herein typically has a high degree of functionality and a correspondingly low equivalent weight. However, it should be appreciated that for other applications, the additive may have low functionality (it may be monofunctional) and a correspondingly high equivalent weight. The active hydrogen group-containing polymer containing onium salt groups is typically present in the thermosetting compositions of the invention in an amount of at least 0.5 percent by weight (when used as an additive) and in an amount of at least 25 percent by weight (when used as a resinous binder), based on total weight of resin solids of the thermosetting composition. The active hydrogen group-containing polymers are also typically present in the thermosetting compositions in an amount of less than 95 percent by weight, and preferably in an amount of less than 80 percent by weight, based on total weight of resin solids of the thermosetting composition. The active hydrogen group-containing polymer may be present in the thermosetting compositions of the invention in an amount ranging between any combination of these values, inclusive of the recited values.

The thermosetting composition of the present invention further comprises (b) a curing agent having at least two functional groups which are reactive with the active hydrogen groups of the polymer (a) described above.

Examples of suitable curing agents for use in the thermosetting compositions of the invention include polyisocyanate and aminoplast curing agents. The preferred curing agents for use in thermosetting compositions of the invention, particularly for cationic electrodeposition, are blocked organic polyisocyanates. The polyisocyanates can be fully blocked as described in U.S. Pat. No. 3,984,299 column 1, lines 1 to 68, column 2, and column 3, lines 1 to 15, or partially blocked and reacted with the polymer backbone as described in U.S. Pat. No. 3,947,338 column 2, lines 65 to 68, column 3, and column 4, lines 1 to 30, which are incorporated by reference herein. By "blocked" is meant that the isocyanate groups have been reacted with a compound so that the resultant blocked isocyanate group is stable to active hydrogens at ambient temperature but reactive with active hydrogens in the film forming polymer at elevated temperatures usually between 90° C. and 200° C.

Suitable polyisocyanates include aromatic and aliphatic polyisocyanates, including cycloaliphatic polyisocyanates and representative examples include diphenylmethane-4,4'-diisocyanate (MDI), 2,4- or 2,6-toluene diisocyanate (TDI), including mixtures thereof, p-phenylene diisocyanate, tetramethylene and hexamethylene diisocyanates, dicyclohexylmethane-4,4'-diisocyanate, isophorone diisocyanate, mixtures of phenylmethane-4,4'-diisocyanate and polymethylene polyphenylisocyanate. Higher polyisocyanates such as triisocyanates can be used. An example would include triphenylmethane-4,4',4"-triisocyanate. Isocyanate prepolymers with polyols such as neopentyl glycol and trimethylolpropane and with polymeric polyols such as polycaprolactone diols and triols (NCO/OH equivalent ratio greater than 1) can also be used.

The polyisocyanate curing agent is typically utilized in conjunction with the active hydrogen group-containing polymer (a) in an amount of at least 1 percent by weight, preferably at least 15 percent by weight, and more preferably at least 25 percent by weight. Also, the polyisocyanate curing agent is typically used in conjunction with the active hydrogen group-containing polymer in an amount of less than 50 percent by weight, and preferably less than 40 percent by weight, based on weight of total resin solids of (a) and (b). The polyisocyanate curing agent may be present in the thermosetting composition of the present invention in an amount ranging between any combination of these values, inclusive of the recited values.

The thermosetting compositions of the present invention are in the form of an aqueous dispersion. The term "dispersion" is believed to be a two-phase transparent, translucent or opaque resinous system in which the resin is in the dispersed phase and the water is in the continuous phase. The average particle size of the resinous phase is generally less than 1.0 and usually less than 0.5 microns, preferably less than 0.15 micron.

The concentration of the resinous phase in the aqueous medium is at least 1 and usually from about 2 to about 60 percent by weight based on total weight of the aqueous dispersion. When the compositions of the present invention are in the form of resin concentrates, they generally have a resin solids content of about 20 to about 60 percent by weight based on weight of the aqueous dispersion.

The thermosetting compositions of the invention are typically in the form of electrodeposition baths which are usually supplied as two components: (1) a clear resin feed, which includes generally the active hydrogen-containing polymer which contains onium salt groups, i.e., the main film-forming polymer, the curing agent, and any additional water-dispersible, non-pigmented components; and (2) a pigment paste, which generally includes one or more pigments, a water-dispersible grind resin which can be the same or different from the main film-forming polymer, and, optionally, additives such as wetting or dispersing aids. Electrodeposition bath components (1) and (2) are dispersed in an aqueous medium which comprises water and, usually, coalescing solvents. Alternatively, the electrodeposition bath may be supplied as a one-component system which contains the main film-forming polymer, the curing agent, the pigment paste and any optional additives in one package. The one-component system is dispersed in an aqueous medium as described above.

The electrodeposition bath of the present invention has a resin solids content usually within the range of about 5 to 25 percent by weight based on total weight of the electrodeposition bath.

As aforementioned, besides water, the aqueous medium may contain a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene or propylene glycol. The amount of coalescing solvent is generally between about 0.01 and 25 percent and when used, preferably from about 0.05 to about 5 percent by weight based on total weight of the aqueous medium.

As discussed above, a pigment composition and, if desired, various additives such as surfactants, wetting agents or catalyst can be included in the dispersion. The pigment composition may be of the conventional type comprising pigments, for example, iron oxides, strontium chromate, carbon black, coal dust, titanium dioxide, talc, barium sulfate, as well as color pigments such as cadmium yellow, cadmium red, chromium yellow, and the like. The pigment content of the dispersion is usually expressed as a pigment-to-resin ratio. In the practice of the invention, when pigment is employed, the pigment-to-resin ratio is usually within the range of about 0.02:1/1:1. The other additives mentioned above are usually in the dispersion in amounts of about 0.01 to 3 percent by weight based on weight of resin solids.

The thermosetting compositions of the present invention can be applied by electrodeposition to a variety of electroconductive substrates especially metals such as untreated steel, galvanized steel, aluminum, copper, magnesium and conductive carbon coated materials. The applied voltage for electrodeposition may be varied and can be, for example, as low as 1 volt to as high as several thousand volts, but typically between 25 and 500 volts. The current density is usually between 0.5 ampere and 5 amperes per square foot and tends to decrease during electrodeposition indicating the formation of an insulating film.

After the coating has been applied by electrodeposition, it is cured usually by baking at elevated temperatures such as about 90° C. to about 260° C. for about 1 to about 40 minutes.

The present invention is more particularly described in the following examples, which are intended to be illustrative only, since numerous modifications and variations therein will be apparent to those skilled in the art. Unless otherwise specified, all parts and percentages are by weight.

EXAMPLE 1

A solution of 2,2'-azobis(2-methylbutyronitrile) (available as VAZO® 67 from E.I. du Pont de Nemours and Company, Wilmington, Del.) in toluene was heated to 90° C. for three hours to produce the denitrogenated iniferter 2,3-dimethyl-2,3-dicyanobutane (DDCB).

EXAMPLE 2–4

The 2,2'-azobis(2-methylbutyronitrile) (VAZO® 67) was added to toluene, sparged with nitrogen for 15 minutes and heated to 80° C. over a period of two hours to form DDCB. Each monomer charge was added over a 30 minute period and then held at the specified temperature for the specified period of time. Molecular weight measurements were made at appropriate intervals to determine whether the monomers were polymerizing into the quasi-living polymer. The details appear in Table 1.

TABLE 1

|  | Example 2 | Example 3 | Example 4 |
| --- | --- | --- | --- |
| Vazo ® 67 | 15 g | 0.20 g | 40 g |
| Toluene | 300 g | 5.0 ml | 300 g |
| Monomer 1 | IBMA[2], 180 g Toluene, 200 g | VAc, 5 ml | IBMA[2], 200 g GMA[1], 35 g |
| Temp./Time | 80° C., 2 hrs. | 70° C., 11 hrs. | 80° C., 2 hrs. |
| Monomer 2 | HPMA[3], 120 g |  | EHMA[4], 250 g |
| Temp./Time | 80° C., 2 hrs. |  | 80° C., 2 hrs. |
| GPC[5] Mw/PD[6] | 14,266/1.69 | 32,636/1.67 | 12,679/1.93 |
| Time Interval | 2.5 hrs. | 4 hrs. | 2.5 hrs. |
| GPC[5] Mw/PD[6] | 15,260/1.80 | 33,865/1.61 | 19,985/1.74 |
| Time Interval | 5 hrs. | 11 hrs. | 5 hrs. |

[1]glycidylmethacrylate
[2]isobutylmethacrylate
[3]hydroxypropylmethacrylate
[4]2-ethylhexylmethacrylate
[5]Gel Permeation Chromatography using polystyrene standards
[6]Polydispersity Index = Mw/Mn The data demonstrate the efficacy of the monofunctional iniferters of the present invention as well as the preparation of both homopolymers and block copolymers. The increase in molecular weight after the addition of the second monomer demonstrates its incorporation into the block copolymer. The unimodal nature of the GPC curves in each case also verifies block copolymer formation as two homopolymers would appear as a bi- or multi-modal distribution.

The present invention has been described with reference to specific details of particular embodiments thereof. It is not intended that such details be regarded as limitations upon the scope of the invention except insofar as and to the extent that they are included in the accompanying claims.

We claim:

1. A non-random copolymer of the following general formula:

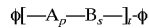

wherein:
a) A and B are different compositions of ethylenically unsaturated monomers;
b) p is an integer from 1 to 1,000;
c) s is an integer from 1 to 1,000;
d) t is an integer from 1 to 100; and
e) φ is a residue from a carbon centered radical capable of initiating free radical polymerization with one or more stabilizing groups for a carbon centered radical.

2. The non-random copolymer of claim 1, wherein the residue φ has the general formula:

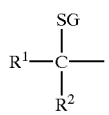

wherein $R^1$ is selected from the group consisting of $C_1$–$C_{20}$ alkyl, cyclic, heterocyclic, alkynol, or aryl; $R^2$ is selected from the group consisting of H and $C_1$–$C_4$ alkyl and SG is a radical stabilizing group.

3. The non-random copolymer of claim 1, wherein the residue φ is selected from the group consisting of an azobisalkylonitrile having the general structure:

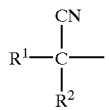

a bisphenylalkane having the following structure:

a bishalolalkane having the following structure:

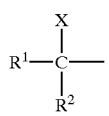

a substituted biscarboxyalkane having the following structure:

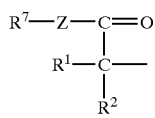

and a bisnitroalkane having the following structure:

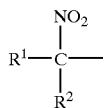

wherein $R^1$ and $R^2$ are independently selected from the group consisting of $C_1$–$C_{20}$ alkyl, cyclic, heterocyclic and alkynol; $R^7$ is selected from the group consisting of H, $C_1$–$C_{20}$ alkyl, cyclic, heterocyclic, alkynol, and aryl; Z is selected from the group consisting of O and NH; and X is a halide.

4. The non-random copolymer of claim 2, wherein the residue φ is selected from the group consisting of 4-cyanovaleric acid, cyclohexanecarbonitrile, n,n-dimethylformamide, isobutyronitrile, 2-methylpropionamidine, 2-2-methylbutyronitrile, propionitrile, 2,4-dimethylvaleronitrile and valeronitrile.

5. The non-random copolymer of claim 1, wherein the ethylenically unsaturated monomers are of the general formula:

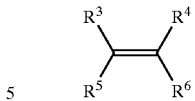

wherein $R^3$, $R^4$ and $R^6$ are independently selected from the group consisting of H, halogen, CN, $CF_3$, straight or branched alkyl of 1 to 20 carbon atoms, aryl, unsaturated straight or branched alkenyl or alkynyl of 2 to 10 carbon atoms, unsaturated straight or branched alkenyl of 2 to 6 carbon atoms substituted with a halogen, $C_3$–$C_8$ cycloalkyl, heterocyclyl and phenyl; $R^5$ is selected from the group consisting of H, halogen, $C_1$–$C_6$ alkyl, CN, $COOR^8$, wherein $R^8$ is selected from the group consisting of H, an alkali metal, a $C_1$–$C_6$ alkyl group and aryl.

6. The non-random copolymer of claim 4, wherein the ethylenically unsaturated monomers are alkyl (meth) acrylates.

7. The non-random copolymer of claim 1 having a number average molecular weight of from 500 to 1,000,000 as measured by gel permeation chromatography using polystyrene standards.

8. The non-random copolymer of claim 1 having a polydispersity index of less than 2.5.

* * * * *